H. SCHWING.
SERVING DISH.
APPLICATION FILED DEC. 29, 1915.

1,225,870.

Patented May 15, 1917.

Attest:

Henrietta Schwing,
Inventor.

by Robert B. Killgore,
Atty

UNITED STATES PATENT OFFICE.

HENRIETTA SCHWING, OF NEW YORK, N. Y., ASSIGNOR TO MARK CROSS COMPANY, OF NEW YORK, N. Y., A CORPORATION OF NEW YORK.

SERVING-DISH.

1,225,870.      Specification of Letters Patent.      Patented May 15, 1917.

Application filed December 29, 1915. Serial No. 69,178.

*To all whom it may concern:*

Be it known that I, HENRIETTA SCHWING, a citizen of the United States, and a resident of the city, county, and State of New York, have invented a new and useful Improvement in Serving-Dishes, of which the following is a specification.

My invention relates to serving dishes for food and my objects are the production of a combination dish which may be handled as a unit and carry the necessary food, the condiments and eating utensils, and yet be readily disassembled for washing and cleaning.

Figure 1:
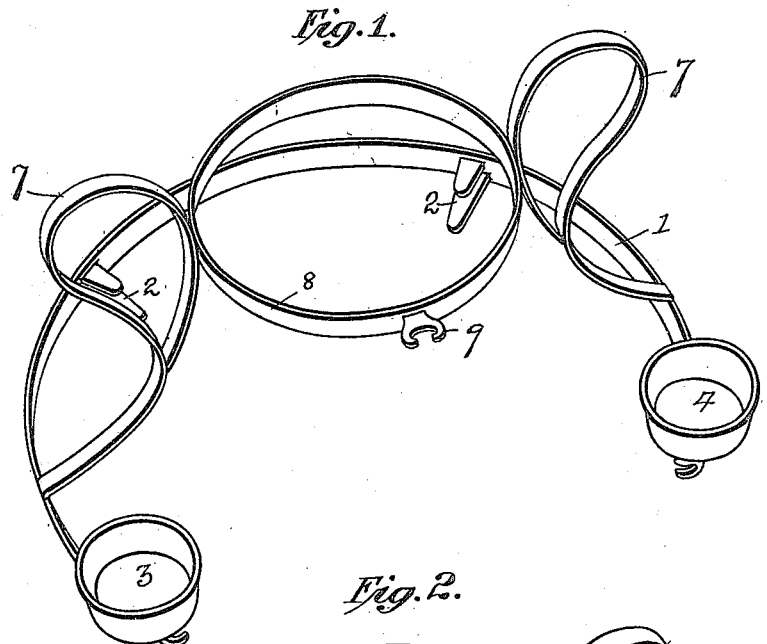
Figure 2:
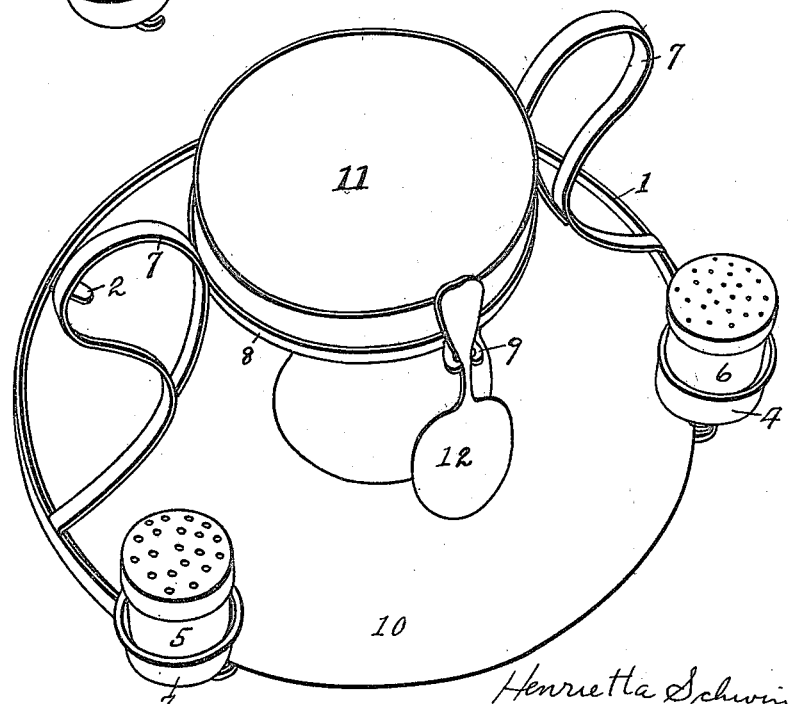

The drawing shows my invention as used for serving eggs. Figure 1 is a view of a metal frame and Fig. 2 a view of the frame on a plate with an egg cup, the condiment holders and a spoon.

The frame is formed of an open ring 1 provided with claws 2—2 projecting inwardly: On the edge of this ring are the cups 3 and 4 intended to hold the salt and pepper shakers 5 and 6. A handle 7 rises from the ring 1 and terminates in a ring 8 from which may have a claw 9 secured thereto.

In use the ring 1 is sprung around the edge of a plate 10 with the claws 2—2 engaging either side of the edge. The salt and pepper shakers are placed in the cups, the egg cup 11 is placed in the ring 8 and the spoon 12 hung in the claw 9.

Bread and butter may be placed on the plate and the egg in the cup so that each serving dish is complete in itself and may be handled as a unit.

To wash and clean the entire combination may be quickly disassembled and as quickly reassembled for the next use. Broken plates or cups may be replaced without the expense of an entire new serving dish.

While I have shown my invention as applied to the serving of eggs it is obvious that it is capable of a great variety of modifications such as one handle instead of the two shown and used for serving a variety of food such as oyster or clam cocktails or bouillon.

I claim:—

A serving dish holder comprising a split ring of resilient material, claws projecting inwardly and adapted to engage the edge of a plate, cups adapted to hold condiment shakers on the ring, a handle extending from one portion of the split ring to a point diametrically opposite and a closed, horizontal ring in the handle at the top portion thereof adapted to receive a cup.

In testimony whereof I have hereunto subscribed my name in the presence of two attesting witnesses.

HENRIETTA SCHWING.

Witnesses:
ROBERT B. KILLGORE,
P. F. MURPHY.

Copies of this patent may be obtained for five cents each, by addressing the "Commissioner of Patents, Washington, D. C."